United States Patent [19]

Yokozawa et al.

[11] Patent Number: 5,751,749
[45] Date of Patent: May 12, 1998

[54] LASER OSCILLATOR AND METHOD FOR CONTROLLING THE SAME

[75] Inventors: Takeshi Yokozawa, Yokohama; Hiroshi Hara, Funabashi; Takanobu Yamamoto, Yokohama, all of Japan

[73] Assignee: Ishikawajima-Harima Heavy Industries Co., Ltd., Tokyo, Japan

[21] Appl. No.: 495,033

[22] Filed: Jun. 27, 1995

[51] Int. Cl.$^6$ ............................................. H01S 3/13
[52] U.S. Cl. ........................... 372/32; 372/37; 372/22; 359/328
[58] Field of Search ........................ 372/22, 29, 32, 372/37; 359/328

[56] References Cited

U.S. PATENT DOCUMENTS

| | | |
|---|---|---|
| 5,185,752 | 2/1993 | Welch et al. ............... 372/22 |
| 5,253,259 | 10/1993 | Yamamoto et al. ............ 372/22 |
| 5,274,652 | 12/1993 | Senoh et al. ............... 372/22 |
| 5,303,247 | 4/1994 | Yamamoto et al. ............ 372/22 |
| 5,415,743 | 5/1995 | Harada ..................... 372/22 |

*Primary Examiner*—Leon Scott, Jr.
*Attorney, Agent, or Firm*—Griffin, Butler, Whisenhunt & Kurtossy

[57] ABSTRACT

The invention provides a laser oscillator including (a) laser medium having a characteristic that distortion is caused in the laser medium by applying electric field thereto, (b) an optical pumping source for exciting the laser medium to thereby generate laser beam, (c) a pair of terminals through which a voltage is applied to the laser medium, and (d) an optical resonator including a total reflection coating attached to one of end surfaces of the laser medium and a partial reflection coating attached to the other of end surfaces of the laser medium. The laser oscillator provides advantages as follows: (a) laser outputs can be stabilized; (b) a laser oscillator can be small-sized; and (c) a laser apparatus can be also small-sized by incorporating the small-sized laser oscillator thereinto.

9 Claims, 3 Drawing Sheets

5,751,749

1
LASER OSCILLATOR AND METHOD FOR CONTROLLING THE SAME

BACKGROUND OF THE INVENTION

1. Field of the Invention

The invention relates to a laser apparatus to be used as a measuring instrument and a remote sensing apparatus, and also to a small-sized laser oscillator operating at a stable-longitudinal mode. The invention further relates to a method for controlling such a laser oscillator.

2. Description of the Related Art

In these days, there has been used laser radar utilizing laser beam. FIG. 1 illustrates a schematic diagram of the laser radar. The laser radar has a laser oscillator 10 rotatably supported on a support 11 for radiating laser beam A having superior directivity to an target X to be measured far from the laser oscillator 10. The laser radar is provided with a converging mirror 12, which receives reflected light or scattered light B from the target X and leads the received light to an optical detector 13. The optical detector 13 is in communication with a data processor 14. The optical detector 13 connects to the data processor 14 signals representing data relating to the reflected or scattered light B. The data processor 14 analyzes the received signals with respect to time, frequency and spectroscopy to thereby determine a distance between the laser radar and the target X, what substances the target X is made from, and a profile of the target X. The laser radar is considerably utilized for measuring atmospheric conditions such as pollution of the atmosphere, wind direction and wind velocity.

As aforementioned, in measurements using a laser beam, the laser beam is radiated to the target X to be inspected, and the converging mirror 12 receives reflected or scattered light B from the target X, and then data are analyzed in the data processor 14. Thus, it is desirable that the radiated laser beam has a constant or stable output or frequency. In addition, in order to make it possible to carry out a measurement at various desired places, the laser apparatus is desirably light in weight and small in size so that the system of the laser is portable.

As is known in the art, a laser beam is made as a result of light being amplified due to stimulated emission in a laser medium. In other words, when a laser medium is pumped to thereby excite atoms of active material contained in the laser medium, light inherent to the active material is stimulated to radiate with the result of light amplification. Subsequently, while the amplified light goes and returns between two reflection mirrors which cooperate to compose an optical resonator, the light amplification is further facilitated due to stimulated emission by the amplified light. The amplified light resonates in the optical resonator, and thus increases its energy as a standing wave in the optical resonator mode. When the energy of the amplified light in the above mentioned process becomes greater than energy lost in the optical resonator, lasing happens.

The output power of a laser is dependent on the lasing wavelength. Among wavelength inherent to active material, such an oscillation wavelength is present only in the resonation mode in which standing wave of electromagnetic wave is able to be present. Since the optical resonator mode is dependent on a length of the optical resonator, laser output and wavelength is dependent on a length of an optical resonator. This means that a change of length of the optical resonator would change the resonation mode of laser beam with the result that the energy of amplified light is also varied to thereby change the output and wavelength of the laser.

2
The factors for varying the resonator mode include a change in the length of the optical resonator due to a change in ambient temperature, a change in the length of laser medium, and a change in the index of refraction of laser medium. In particular, a change in the length of an optical resonator affects the laser resonation mode more greatly than any other factors.

As illustrated in FIG. 2, a conventional laser oscillator 20 comprises a laser medium 21, a pumping source 22, and an optical resonator 23 including a total reflection mirror 24 and a partial reflection mirror 25. A length of the optical resonator 23, which is defined as the spacing between the total reflection mirror 24 and the partial reflection mirror 25, is varied by means of a piezoelectric transducer 26 carried by the total reflection mirror 24. An application of a certain voltage to the piezoelectric transducer 26 causes its length to be varied to thereby move the total reflection mirror 24. Thereby the length of the optical resonator 23 is varied to a desired length.

When a laser oscillator is intended to be light and/or small-sized, there is used a so-called monolithic optical resonator in which a material having a certain reflectance is adhered to an end surface of the laser medium to thereby unitize the reflection mirror and the laser medium.

When the length of a laser resonator is to be controlled by moving a reflection mirror with use of a piezoelectric transducer for the purpose of stabilizing laser output or wavelength, it is possible to stabilize laser output or wavelength, however, a laser oscillator has to be large in size because a piezoelectric transducer constituting a part of the laser oscillator is large in size, and a reflection mirror has also a large size. Thus, a laser apparatus into which the above mentioned large-sized laser oscillator is incorporated has to be large in size, which is accompanied with a problem that such a large-sized laser oscillator is inconvenient for measuring and handling.

On the other hand, when a monolithic optical resonator is to be used in order to make a laser apparatus to be lighter and smaller-sized, it is surely possible to make the laser apparatus to be smaller-sized because the monolithic optical resonator is provided with reflection mirrors attached to opposite ends of the laser medium. However, a process in which a reflection mirror is moved by means of a piezoelectric transducer for varying the length of an optical resonator cannot be theoretically applied to a monolithic optical resonator because, as aforementioned, a reflection mirror is attached to the laser medium. Thus, if the dimension of the laser medium is varied due to a change in temperature, laser output and/or wavelength would also be changed, resulting in the problem that it is not possible to stabilize the laser output or wavelength.

SUMMARY OF THE INVENTION

In view of the foregoing problems, it is an object of the present invention to overcome such problems by providing a small-sized laser oscillator, a laser apparatus and method for controlling the above which are capable of making the laser output or wavelength stable.

In one aspect, the invention provides a laser oscillator including (a) a laser medium having a characteristic that distortion is caused in the laser medium by applying electric field thereto, (b) an optical pumping source for exciting the laser medium to thereby generate a laser beam, (c) a pair of terminals through which a voltage is applied to the laser medium, and (d) an optical resonator including a total reflection coating attached to one of end surfaces of the laser medium and a partial reflection coating attached to the other of end surfaces of the laser medium.

In another aspect, the invention provides a laser apparatus including (A) an oscillator including (a) laser medium having a characteristic that distortion is caused in the laser medium by applying an electric field thereto, (b) an optical pumping source for exciting the laser medium to thereby generate a laser beam, (c) a pair of terminals through which a voltage is applied to the laser medium, and (d) an optical resonator including a total reflection coating attached to one of end surfaces of the laser medium and a partial reflection coating attached to the other of end surfaces of the laser medium, (B) an output/wavelength detector for detecting at least one of output and wavelength of laser beam produced from the laser oscillator to emit a signal corresponding to the detected output and/or wavelength, and (C) a controller for receiving the signal from the output/wavelength detector to control a voltage to be applied to the pair of terminals in accordance with the signal.

The laser medium may have plain end surfaces or convex end surfaces.

In a preferred embodiment, the laser medium has ferroelectric material acting as a host crystal.

In another preferred embodiment, the dopant materials include Nd, Tm, Ho and Er.

In still another preferred embodiment, the pumping source comprises a semiconductor laser.

In yet another preferred embodiment, the total reflection coating has a multi-layered structure of dielectric materials and has a reflectance of 100% at a lasing wavelength.

In still yet another preferred embodiment, the dielectric materials include $CaF_2$, $MgF_2$, ZnSe and $SiO_2$.

In further preferred embodiment, the partial reflection coating includes a multi-layered structure of dielectric materials and has a reflectance in the range of 99% to 99.7% so that laser output is maximized at a lasing wavelength.

In further preferred embodiment, the dielectric materials include $CaF_2$, $MgF_2$, ZnSe and $SiO_2$.

In still another aspect, the invention provides a method of controlling a laser oscillator, the laser oscillator including (a) laser medium having a characteristic that distortion is caused in the laser medium by applying electric field thereto, (b) an optical pumping source for exciting the laser medium to thereby generate a laser beam, (c) a pair of terminals through which a voltage is applied to the laser medium, and (d) an optical resonator including a total reflection coating attached to one of end surfaces of the laser medium and a partial reflection coating attached to the other of end surfaces of the laser medium, the method including the steps of (a) detecting one of output and wavelength of laser beam produced from the laser resonator, (b) emitting a signal in accordance with the detected output or wavelength, and (c) varying an intensity of a field to be applied to the laser medium in accordance with the signal to thereby cause distortion effect in the laser medium for varying a dimension of the laser medium to change a characteristic of the optical resonator to thereby control one of output and wavelength of laser.

In a preferred embodiment, the distortion effect is based on at least one of converse piezoelectric effect and electrostriction effect.

The advantages obtained by the aforementioned present invention will be described hereinbelow.

In the laser oscillator and the laser apparatus in accordance with the invention, the laser medium consists of a material having a characteristic that the distortion is caused by an application of an electric field thereto. The laser medium is disposed between a pair of terminals. When a voltage is applied across the pair of terminals to thereby apply an electric field to the laser medium, a distortion is caused in the laser medium in accordance with an intensity of the field by converse piezoelectric effect and/or electrostriction effect.

Herein providing that a distortion is represented with "s", an applied voltage "E", a piezoelectric constant "d", and an electrostriction constant "M", d and M are tensors and have inherent values depending on what kind of crystal is used. The distortion s is in general in proportion to $(dE+ME^2)$.

The converse piezoelectric effect is a primary effect represented with the first element in the above mentioned equation, dE, and means an effect that a distortion is caused in proportion to an electric field applied to a crystal. The electrostriction effect is a secondary effect represented with the second element in the above mentioned equation, $ME^2$. When an electric field to be applied to a crystal is small, only the primary effect may be taken into consideration. However, as a distortion or an electric field is larger, the secondary effect has to be taken into consideration.

Thus, distortion caused in the laser medium could vary a length of an optical resonator, and hence it is possible to vary the output power or the lasing wavelength.

The output or wavelength of laser beam produced from the laser oscillator is detected by the laser output/wavelength detector, which in turn emits detection signals to the controller. The controller controls a voltage to be applied across the terminals in accordance with the detection signals, to thereby vary an intensity of the electric field. Thus, even if a length of the optical resonator is varied due to a change in ambient temperature to thereby cause the laser output or wavelength to be varied, it is possible to control the laser output or lasing wavelength to be uniform by adjusting a length of the optical resonator in accordance with the change in the laser output or wavelength.

In brief, in the laser oscillator and the laser apparatus in accordance with the invention, the laser oscillator is made of material having a characteristic that a distortion is caused by converse piezoelectric effect and/or electrostriction effect caused by an application of a voltage to the laser medium. Thus, the output or wavelength of laser can be controlled by controlling an intensity of an electric field acting on the laser medium. As a result, the invention provides advantages as follows: (a) a laser output can be stabilized; (b) a laser oscillator can be small-sized; and (c) a laser apparatus can be also small-sized by incorporating the small-sized laser oscillator thereinto.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

Figure 1:
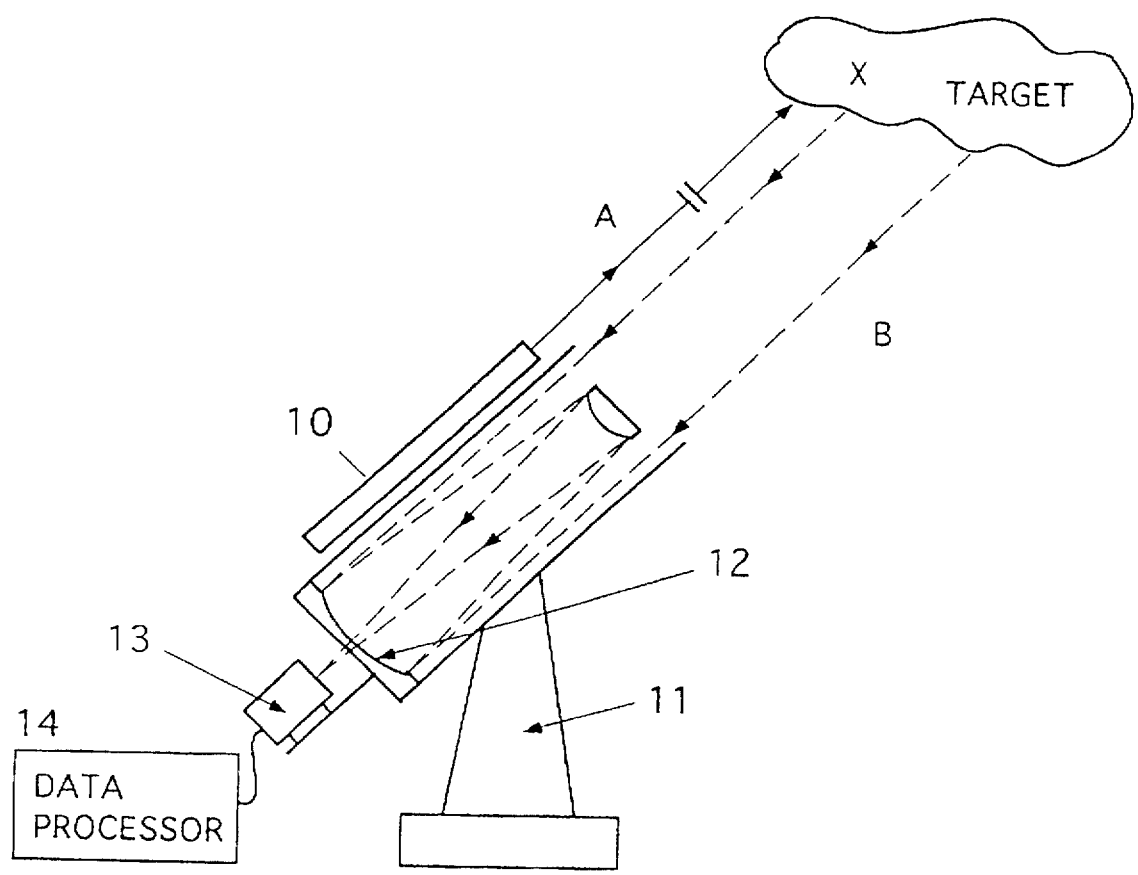
FIG. 1 is a schematic view illustrating a measuring apparatus utilizing a laser apparatus therein.
Figure 2:
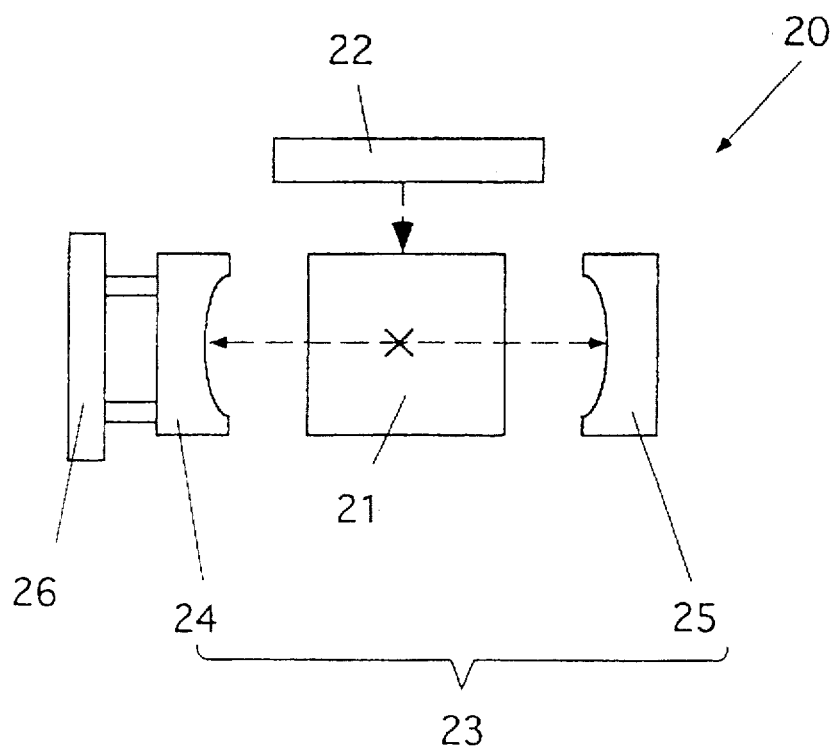
FIG. 2 is a schematic view of a conventional laser oscillator.
Figure 3:
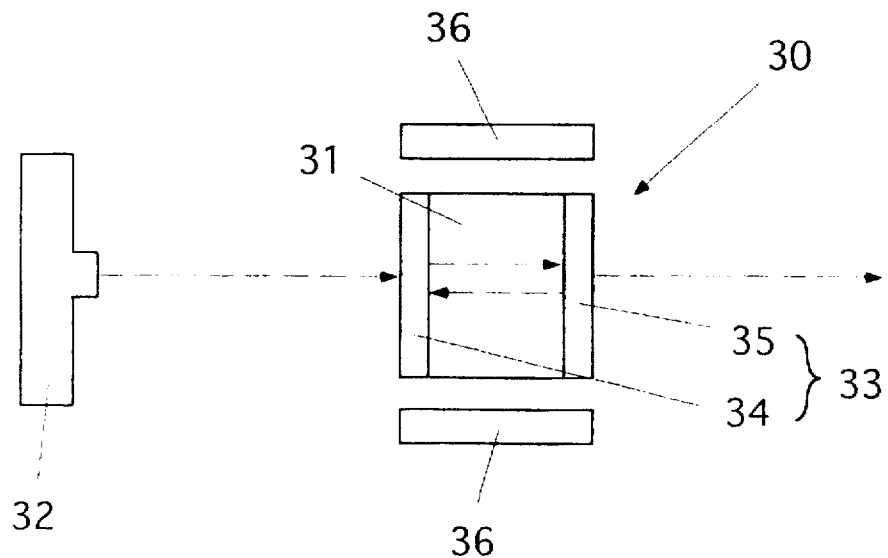
FIG. 3 is a schematic view of a laser oscillator in accordance with the invention.

FIG. 3 illustrates a laser oscillator 30 in accordance with an embodiment of the invention. The laser oscillator 30 includes laser medium comprising host crystals, such as ferroelectric materials, composed of a material having a characteristic that a distortion is caused by applying an electric field thereto, and rare earth materials such as Nd, Tm, Ho and Er acting as a laser dopant.

An optical pumping source 32 such as a semiconductor laser excites the laser medium 31 for producing laser beams.

An optical resonator 33 comprises a total reflection coating 34 and a partial reflection coating 35. The total reflection coating 34 allows an excited light radiated from the optical pumping source 32 to pass therethrough. The total reflection coating 34 comprises a multi-layered structure of dielectric materials such as CaF2, MgF2, ZnSe and SiO2 evaporated by a thickness of tens of microns on an end surface of the laser medium 31 facing to optical pumping source 32, and has a reflectance of 100% at a wavelength at which the lasing occurs. Similarly, the partial reflection coating 35 comprises a multi-layered structure of dielectric materials evaporated by a thickness of tens of microns on the other end surface of the laser medium 31, and has a reflectance in the range of 99% to 99.7% so that the laser output is maximized at a wavelength at which the lasing occurs.

A pair of terminals 36 are disposed at the opposite sides of the laser medium 31, and are made of electrically conductive metal such as copper. To the terminals 36 is applied a voltage in the range of hundreds of volts to a few KV in order to generate an electric field having an intensity enough to cause a desired distortion in the laser medium 31.

Thus, a length of the optical resonator 30, namely, a spacing between the coatings 34 and 35, is varied by the characteristic of the laser medium 31 that a distortion is caused by converse piezoelectric effect and/or electrostriction effect, so that the laser output or wavelength can be controlled.

In addition, since the total and partial reflection coatings 34 and 35 is thin and a piezoelectric transducer are no longer necessary to be provided unlike a prior optical resonator, the laser oscillator can be shortened in a direction of an optical axis thereof, and further can be small-sized.

Figure 4:
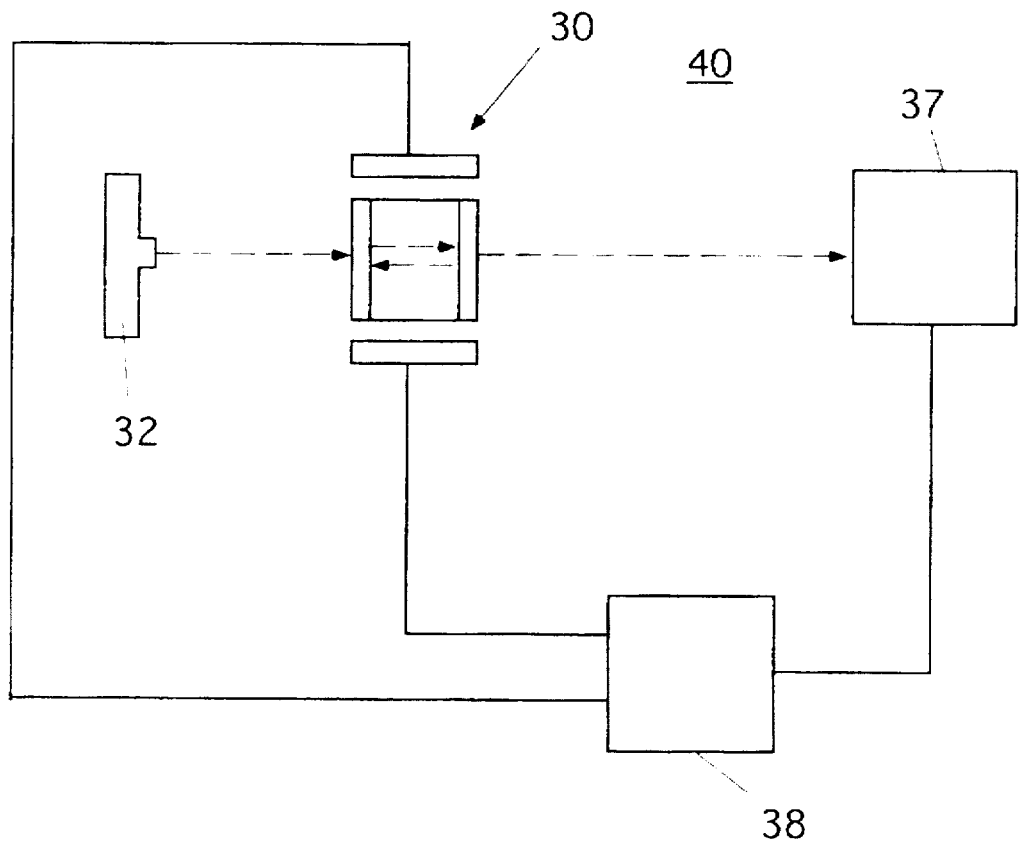
FIG. 4 is a schematic view illustrating a laser apparatus in accordance with the invention.

FIG. 4 illustrates a laser apparatus 40 in accordance with the invention. As illustrated, the laser apparatus 40 comprises the above mentioned laser oscillator 30 for oscillating laser beams, a laser output/wavelength detector 37 for detecting output or wavelength of the laser beam oscillated from the laser oscillator 30, and a controller 38 for controlling a voltage to be applied across the pair of terminals 36 in response to detection signals transmitted from the laser output/wavelength detector 37.

The laser output/wavelength detector 37 converts a variation in laser output or wavelength into a variation in voltage or current, and thus detects a variation in laser output or wavelength. In the case that the output is to be detected, as the detector 37 is used a semiconductor detector suitable for an oscillation wavelength, such as a Si photo diode, GaAs and PbS, or a pyroelectric detector. On the other hand, in the case that a wavelength is to be detected, as the detector 37 one may use, for instance, a combination of Fabry-Perot type spectroscope and the above mentioned semiconductor detector.

The controller 38 amplifies, modulates or converts signals transmitted from the laser output/wavelength detector 37, and then transmits high voltage signals suitable for varying crystals of the laser medium 31.

The output or wavelength of the laser beam produced from the laser oscillator 33 is detected by the laser output/wavelength detector 37, which in turn emits detection signals to the controller 38. The controller 38 controls a voltage to be applied across the pair of terminals 36 in accordance with the detection signals, to thereby vary an intensity of the electric field to be applied to the laser medium 31. Thus, even if a length of the optical resonator 30 is varied due to a change in ambient temperature to thereby cause the laser output or wavelength to be varied, it is possible to control the laser output or wavelength to be uniform by adjusting a length of the optical resonator 30 in accordance with the change in the laser output or wavelength. In addition, since the laser apparatus in accordance with the invention incorporates the small-sized laser oscillator 30, the laser apparatus can also be small-sized.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. An apparatus for lasing, comprising:
   a laser oscillator comprising (a) a laser medium having two ends and having a dimension variable by one or more of converse piezoelectric and electrostriction effects when an electric field is applied thereto, (b) an optical pumping source for exciting said laser medium to thereby generate a laser beam, (c) a pair of terminals through which a voltage is applied to said laser medium to thereby apply an electric field to the laser medium and vary said dimension, and (d) an optical resonator containing the laser medium and including a total reflection coating attached to one of end of the laser medium and a partial reflection coating attached to the other of end of the laser medium;
   an output/wavelength detector, positioned to receive said laser beam, and for detecting at least one of the output and the wavelength of the laser beam produced from said laser oscillator to produce a signal corresponding to the detected output and/or wavelength; and
   a controller operatively connected to receive said signal from said output/wavelength detector to control the electric field applied by said pair of terminals in accordance with said signal, to thereby vary said dimension and control at least one of the output and the wavelength of the laser beam.

2. The apparatus as recited in claim 1, wherein said laser medium comprises ferroelectric material host crystal.

3. The apparatus as recited in claim 2, wherein said laser medium further comprises a rare earth dopant selected from the group consisting of Nd, Tm, Ho and Er.

4. The laser oscillator as recited in claim 1, wherein said optical pumping source comprises a semiconductor laser.

5. The laser oscillator as recited in claim 1, wherein said total reflection coating comprises a multi-layered structure of dielectric materials and has a reflectance of 100% at a lasing wavelength.

6. The laser oscillator as recited in claim 5, wherein said dielectric materials include $CaF_2$, $MgF_2$, ZnSe and $SiO_2$.

7. The laser oscillator as recited in claim 1, wherein said partial reflection coating comprises a multi-layered structure of dielectric materials and has a reflectance in the range of 99% to 99.7% so that laser output is maximized at a lasing wavelength.

8. The laser oscillator as recited in claim 7, wherein said dielectric materials include $CaF_2$, $MgF_2$, ZnSe and $SiO_2$.

9. An method of controlling a laser oscillator, said laser oscillator comprising (a) a laser medium having two ends and having a dimension variable by one or more of converse piezoelectric and electro constriction effects when an electric field is applied thereto, (b) an optical pumping source for exciting said laser medium to thereby generate a laser beam, (c) a pair of terminals through which a voltage is applied to said laser medium to thereby apply an electric field to the laser medium, and (d) an optical resonator containing the laser medium and including a reflection coating attached to one of end of the laser medium and a partial reflection coating attached to the other of end of the laser medium, said method comprising the steps of:

detecting one of an output and wavelength of the laser beam generated by said laser oscillator;

producing a signal in accordance with the detected output or wavelength; and varying an intensity of said field applied to said laser medium in accordance with said signal to thereby cause a converse piezoelectric and/or electrostriction effect in said laser medium thereby varying said dimension of said laser medium to thereby control one of said output and wavelength of said laser.

* * * * *